US009954980B2

(12) United States Patent
Katmor et al.

(10) Patent No.: US 9,954,980 B2
(45) Date of Patent: Apr. 24, 2018

(54) SYSTEMS AND METHODS FOR MALICIOUS CODE DETECTION ACCURACY ASSURANCE

(71) Applicant: enSilo Ltd., Herzlia (IL)

(72) Inventors: Roy Katmor, Herzlia (IL); Tomer Bitton, Herzlia (IL); Udi Yavo, Herzlia (IL); Ido Kelson, Herzlia (IL)

(73) Assignee: enSilo Ltd., Herzlia (IL)

( * ) Notice: Subject to any disclaimer, the term of this patent is extended or adjusted under 35 U.S.C. 154(b) by 144 days.

(21) Appl. No.: 14/949,918

(22) Filed: Nov. 24, 2015

(65) Prior Publication Data

US 2016/0149887 A1 May 26, 2016

Related U.S. Application Data

(60) Provisional application No. 62/083,985, filed on Nov. 25, 2014, provisional application No. 62/147,040, filed on Apr. 14, 2015.

(51) Int. Cl.
*H04L 29/06* (2006.01)

(52) U.S. Cl.
CPC ........ *H04L 69/161* (2013.01); *H04L 63/0236* (2013.01); *H04L 63/0263* (2013.01);
(Continued)

(58) Field of Classification Search
CPC . H04L 63/14; H04L 63/1408; H04L 63/1416; H04L 63/1425; H04L 63/1433
See application file for complete search history.

(56) References Cited

U.S. PATENT DOCUMENTS

| 7,287,281 B1 | 10/2007 | Szor |
| 7,793,346 B1 | 9/2010 | Daub |
| 8,032,940 B1 | 10/2011 | Dhanani |
| 8,893,278 B1 | 11/2014 | Chechik |
| 2009/0172102 A1 | 7/2009 | Chesnutt et al. |
| 2010/0293618 A1 | 11/2010 | Medvedev et al. |

(Continued)

FOREIGN PATENT DOCUMENTS

| JP | 2005151492 | 6/2005 |
| WO | WO 02/061510 | 8/2002 |

(Continued)

OTHER PUBLICATIONS

International Search Report and the Written Opinion dated Mar. 2, 2016 From the International Searching Authority Re. Application No. PCT/IL2015/051136.
International Search Report and the Written Opinion dated Mar. 2, 2016 From the International Searching Authority Re. Application No. PCT/IL2015/051139.
International Preliminary Report on Patentability dated Jun. 8, 2017 From the International Bureau of WIPO Re. Application No. PCT/IL2015/051136.
International Preliminary Report on Patentability dated Jun. 8, 2017 From the International Bureau of WIPO Re. Application No. PCT/IL2015/051139. (10 Pages).

(Continued)

*Primary Examiner* — Edward Zee

(57) ABSTRACT

There is provided a method for authenticating an attempt at establishment of a network connection by allowed code, comprising: providing a dataset having previously observed stack trace templates each representing a stack trace pattern prevailing in stack traces recorded by monitoring stacks of clients executing an allowed code during a connection establishment process for establishing network connections related to the allowed code; receiving a new stack trace recorded during a new connection establishment process for a new network connection by a new client; measuring a similarity between the new stack trace and the plurality of stack trace templates to identify a match to a stack trace template; evaluating the matched stack trace template for a predefined rule requirement; and updating a rule-set database with the matched stack trace template to authenticate new network connection establishments associated with stack templates matching the matched stack trace template.

24 Claims, 5 Drawing Sheets

(52) U.S. Cl.
CPC ...... *H04L 63/1416* (2013.01); *H04L 63/0281* (2013.01); *H04L 63/1441* (2013.01)

(56) References Cited

U.S. PATENT DOCUMENTS

| | | | | |
|---|---|---|---|---|
| 2012/0030731 | A1* | 2/2012 | Bhargava | ............... G06F 21/54 726/3 |
| 2013/0275981 | A1 | 10/2013 | Dalcher | |
| 2014/0068326 | A1 | 3/2014 | Quinn | |
| 2014/0082739 | A1* | 3/2014 | Chess | ................. G06F 21/577 726/25 |
| 2014/0310811 | A1 | 10/2014 | Hentunen | |
| 2016/0149937 | A1 | 5/2016 | Katmor et al. | |

FOREIGN PATENT DOCUMENTS

| | | |
|---|---|---|
| WO | WO 2016/084073 | 6/2016 |
| WO | WO 2016/084076 | 6/2016 |

OTHER PUBLICATIONS

Rao et al. "Measurement and Analysis of TCP Connection Establishment Phase of Web Server", Asian Journal of Computer Science and Information Technology, 1(2): 41-44, 2011.
Roundy et al. "Hybrid Analysis and Control of Malware", Proceedings of the 13th International Conference on Recent Advances in Intrusion Detection, Raid 2010, Ottawa, Ontario, Canada, Sep. 15-17, 2010, 6307: 317-338, Sep. 2010.
Official Action dated Oct. 25, 2017 From the US Patent and Trademark Office Re. U.S. Appl. No. 14/949,913. (76 pages).
Notice of Eligibility for Grant, Search Report and Examination Report dated Nov. 16, 2017 From the Intellectual Property Office of Singapore, IPOS Re. Application No. 11201704059R. (9 Pages).
Office Action dated Nov. 7, 2017 From the Israel Patent Office Re. Application No. 252500 and Its Translation Into English. (4 Pages).
Written Opinion dated Nov. 15, 2017 From the Intellectual Property Office of Singapore, IPOS Re. Application No. 11201704060R. (7 Pages).

* cited by examiner

SYSTEMS AND METHODS FOR MALICIOUS CODE DETECTION ACCURACY ASSURANCE

RELATED APPLICATIONS

This application claims the benefit of priority under 35 USC § 119(e) of U.S. Provisional Patent Application Nos. 62/083,985 filed on Nov. 25, 2014 and 62/147,040, filed on Apr. 14, 2015. The contents of all of the above applications are incorporated by reference as if fully set forth herein in their entirety.

BACKGROUND

The present invention, in some embodiments thereof, relates to systems and methods for malicious connection detection and, more specifically, but not exclusively, to systems and methods for accuracy assurance of malicious communication detection.

Certain types of malicious code attack computers and use the host computer to connect to other servers through a network connection. In one example, the network connection is initiated by the malicious code itself, for example, to send stolen data to a remote server. In another example, the malware injects code to a legitimate application, the injected code then initiates a connection to a remote server to send stolen data.

One example of a type of malicious attack is an advanced targeted attack (ATA), which is a sophisticated attack in which an unauthorized party gains access to a network and stays undetected for a long period of time. The intention of most ATAs is to steal data rather than cause damage to the network. ATAs target organizations in sectors with high-value information, such as credit card processors, government agencies, and the financial services industry.

Examples of Anti-ATA solutions are based on detection of the attack or detection of the infiltrated malicious code. In another example, other tools are designed to detect abnormal or malicious activity in action.

SUMMARY

According to an aspect of some embodiments of the present invention there is provided a method for authenticating an attempt at establishment of a network connection by allowed code, comprising: providing a dataset having a plurality of previously observed stack trace templates each representing a stack trace pattern prevailing in stack traces recorded by monitoring a plurality of stacks of a plurality of clients executing an allowed code during a connection establishment process for establishing network connections related to the allowed code; receiving a new stack trace recorded during a new connection establishment process for a new network connection by a new client; measuring a similarity between the new stack trace and the plurality of stack trace templates to identify a match to a stack trace template; evaluating the matched stack trace template for a predefined rule requirement; and updating a rule-set database with the matched stack trace template to authenticate new network connection establishments associated with stack templates matching the matched stack trace template.

Optionally, the plurality of stack trace templates is designated as representing suspicious malicious behavior of the allowed code.

Optionally, the plurality of stack trace templates and the new stack trace include context data collected in association with the stack trace of the allowed code, and the similarity is measured according to the context data. Optionally, the context data includes an event ID and/or host name. Alternatively or additionally, the context data includes at least one member selected from the group consisting of: similar operating system running at the respective client, similar allowed application, similar stack trace data by different allowed applications, and similar protocols to establish the network connection.

Optionally, the method further comprises adding the new stack trace to the dataset as a new stack trace template based on an absence of the match.

Optionally, evaluating the matched stack trace template comprises: incrementing a value of a counter indicative of a number of previous stack trace template matches from different clients, and evaluating the value against the predefined rule requirement of a number of matches. Optionally, the different clients are part of a same designated group.

Optionally, evaluating the matched stack trace template for the predefined rule requirement is performed when the matched stack trace template and the new stack trace are associated with different clients.

Optionally, the method further comprises analyzing the new stack trace, to designate the network connection as being suspicious of being related to malicious code; and further comprises re-designating the suspicion of being related to malicious code as being related to the allowed code. Optionally, the suspicion of being related to malicious code is triggered by a new allowed code installed on the new client displaying malicious-like behavior. Alternatively or additionally, the allowed code represents a false positive identification by incorrectly triggering the identification of suspicious of being related to malicious code. Alternatively or additionally, the stack trace associated with the authenticated new network connection is matched to at least one stack trace template associated with an attempt at establishing the network connection for malicious communication.

Optionally, the new stack trace and the plurality of stack trace templates further comprise flow-data including at least one member selected from the group consisting of: processes, modules, and threads.

Optionally, the new stack trace displays malicious-like behavior that has a similarity to stack traces related to malicious code.

Optionally, the plurality of stack trace templates are based on authorized installation of similar allowed code on a plurality of the clients within a predefined period of time.

Optionally, the predefined requirement is selected to prevent or reduce false positive connection blocking of allowed network connections by the allowed code.

Optionally, the predefined requirement represents a tolerance level for false positive connection blocking of allowed network connections.

According to an aspect of some embodiments of the present invention there is provided a system for authenticating an attempt at establishment of a network connection by allowed code, comprising: a dataset having a plurality of previously observed stack trace templates each representing a stack trace pattern prevailing in stack traces recorded by monitoring a plurality of stacks of a plurality of clients executing an allowed code during a connection establishment process for establishing network connections related to the allowed code; and at least one event management server including a code implementable by a processor of the at least one event management server to: receive a new stack trace recorded at a certain new client of a plurality of clients during a new connection establishment process for a new network connection by the certain new client; measure a similarity between the new stack trace and the plurality of stack trace templates to identify a match to a stack template; evaluate the matched stack trace template for a predefined requirement; and update a rule-set database with the matched stack trace template to authenticate new network connection establishments associated with stack templates matching the matched stack trace template.

Optionally, the system further comprises at least one gateway server in communication with the event management server and with at least one of the plurality of client terminals, the at least one gateway server including a code implementable by a processor of the at least one gateways server to: analyze the new stack trace to designate the new network connection as being suspicious of being related to malicious code; transmit the new stack trace to the event management server for analysis; receive the updated rule-set database; and allow connection establishment of the new network connection.

Optionally, the at least one event management server is in communication with a plurality of gateway servers, wherein each respective gateway server is in communication with at least one client of the plurality of clients, each respective gateway is includes a code implementable by a processor of each respective gateway to: receive, from the new client, the new stack trace; analyze the new stack trace to determine a presence or absence of a suspected trial to establish a malicious communication wherein the network connection is used for malicious activity; detect an attempt at establishing the network connection for the malicious communication when the new stack trace is correlated with malicious data; and generate a message representing the suspected trial to establish the malicious communication using the network connection; and the code of the event management server is implementable to receive the message from each respective gateway server, and perform the measuring, evaluating and updating to re-designate the new network connection as representing an allowed network connection, to prevent or reduce blocking of false positive network connections by allowed code that appear malicious to the respective gateway. Optionally, the certain new client further comprises an allowed application associated with the allowed code that including a code implementable by a processor of the new client to trigger the suspicious of being related to malicious code identification. Alternatively or additionally, the at least one event management server and the plurality of gateway servers are combined into the at least one event management server.

Optionally, the allowed code is installed as injected code within an application, the injected code being associated with stack data similar to stack data associated with malicious injected code.

Optionally, the allowed code is configured with high level permission to establish a network connection in a manner similar to high level permission obtained by malicious code.

Optionally, the system further comprises a client module for installation at each respective client, the client module including a code implementable by a processor of the respective client to: identify a newly installed application at the respective client; and analyze the newly installed application to identify a trial to establish a connection for malicious communication by the newly installed application. Optionally, the newly installed application is installed as an allowed application by a user that breaches an installation policy.

According to an aspect of some embodiments of the present invention there is provided a computer program product for authenticating an attempt at establishment of a network connection by allowed code, the computer program product comprising: program instructions to provide a dataset having a plurality of previously observed stack trace templates each representing a stack trace pattern prevailing in stack traces recorded by monitoring a plurality of stacks of a plurality of clients executing an allowed code during a connection establishment process for establishing network connections related to the allowed code; program instructions to receive a new stack trace recorded during a new connection establishment process for a new network connection by a new client; program instructions to measure a similarity between the new stack trace and the plurality of stack trace templates to identify a match to a stack trace template; program instructions to evaluate the matched stack trace template for a predefined rule requirement; and program instructions to update a rule-set database with the matched stack trace template to authenticate new network connection establishments associated with stack templates matching the matched stack trace template.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1A:
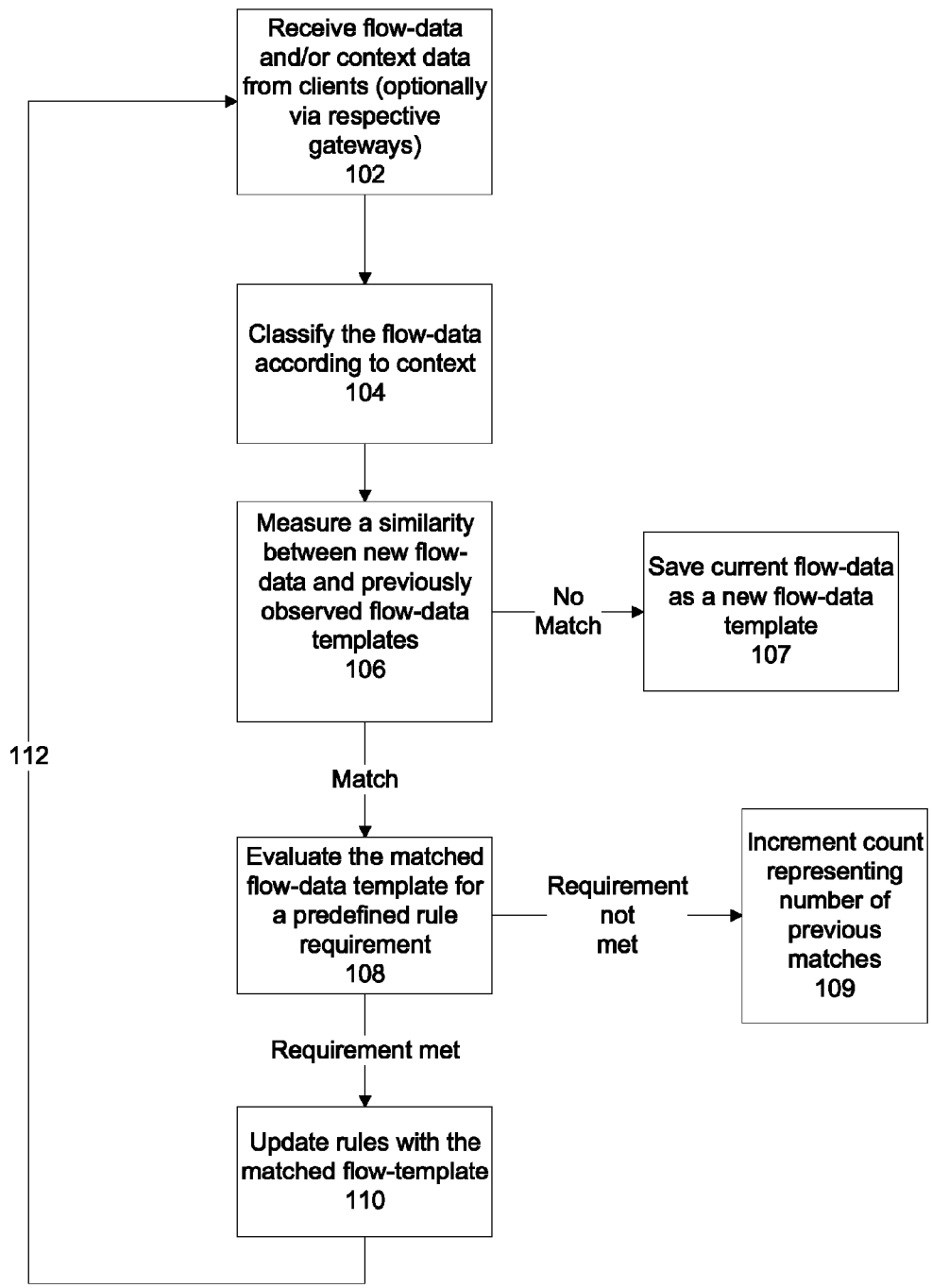
FIG. 1A is a flowchart of a method for evaluating data of a new network connection, in accordance with some embodiments of the present invention.

The present invention, in some embodiments thereof, relates to systems and methods for malicious connection detection and, more specifically, but not exclusively, to systems and methods for accuracy assurance of malicious communication detection.

An aspect of some embodiments of the present invention relates to an event management server that evaluates a new network connection as being related to allowed code, based on a predefined requirement that defines a measured similarity of a match between flow-data associated with the new network connection and a previously observed flow-data (or stack trace) template representing matches with other network connections. Optionally, the predefined requirement represents that similar matches between flow-data of new network connections by other clients have been previously matched to the same template. The matched template is authenticated by the event management server to allow establishment of new network connections, when a sufficient number of clients displaying the same flow-data have been matched to the template. The clients may belong to the same pre-designated group, for example, organization, company, department, and team. The flow-data may occur within the same or similar context data. The authentication based on the predefined requirement may occur, for example, when multiple clients of the same group all install the same allowed code.

Optionally, the event management server authenticates flow-data generated by allowed code, which is suspected of establishment of network connections for malicious activity. When the same (or similar) malicious looking flow-data are observed at multiple different clients, the suspicious flow-data are re-designated as authenticated flow-data, for example, by an update to a rule-set database defining allowed flow-data.

The event management server optionally communicates with one or more gateways, each gateway being in communication with one or more client terminals. Records of stack traces and/or flow-data associated with new unknown code related to a new network establishment process at a new client are analyzed, by measuring a similarity correlation with a previously observed flow-data template, to determine when the new stack trace is associated with allowed code. The flow-data template represents one or more previously observed similar flow-data from other different clients. The number of previous matches may be stored in a counter. When the number of matches exceeds the predefined requirement, the matched flow-data template is authenticated. New flow-data (related to new network connection establishment attempts) matched to the authenticated template are allowed to proceed with the connection establishment.

In some embodiments, the association of the new connection establishment processes being associated with the allowed code is performed in two stages. A first stage (which may be performed by the gateway server in communication with the clients) identifies a suspicious attempt at establishing a network connection for a malicious communication by the unknown code at the client. The second stage (which may be performed by the event managements server connected to the gateway servers) performs quality assurance using previously matching triggered event and its respective flow-data templates to determine whether the suspicious attempt is actually related to allowed code, and therefore safe. When an event along with its respective flow-data template are authenticated, a new rule is added to the database of the gateways, to allow future connection establishments identified by the flow-data template and related to the event.

Optionally, the authentication of the suspicious connection flow-data is performed as additional processing, after the suspicious connection attempt is first identified. The sub-set of connection establishments that are identified as suspicious may be further processed for quality assurance, to ensure that the connection establishment is actually related to malicious code and not to allowed code (e.g., application and/or module). In this manner, the quality assurance processing is centrally performed for the sub-set of suspicious attempts, while designations of normal connection establishment patterns (e.g., performed at a local gateway server) may be locally performed.

In the first state, connection establishments originating from respective client terminals are monitored at one or more gateway servers, based on each of the multiple connected clients transmitting data representative of flow-data related to the connection establishment process to the gateway server for analysis. In the second stage, when the gateway server determines that the connection establishment is suspicious for being associated with malicious activity, an event management server in communication with the gateway server(s) analyzes the data associated with the identified suspicious attempt, by matching to previously triggered matching rule and its respective flow-data template in view of the predefined requirement, to determine when the attempt is actually allowed behavior (i.e., a false positive identification). Optionally, incorrect identifications of malicious activity are corrected to represent normal behavior.

The suspicious attempt is identified based on data analysis that at first correlates with malicious code infection. Flow-data related to the code initiating the suspicious network connection is analyzed to determine when the suspected attempt is generated by allowed normal code, which instead of generating normal appearing data or data flow, generates data that appears to have been generated by malicious code. The suspicious attempt may then be verified by the event management server, which may correct the incorrect classification of the attempt, as actually being related to allowed code (and not to malicious code as originally designated). The network connection may be activated based on the results of the event management server, which at first may have been incorrectly blocked by the first gateway analysis. The network connection may be activated when subsequent similar events are identified and matched, as described herein. It is noted that there may be two modes of operation. The first mode, as described above, blocks the network when the first event is observed (thinking the event is related to malicious activity), and activates the network when additional similar events are observed. The second mode may initially operate as a simulation mode to train the system to recognize events by observation only, without interfering with network activation and/or blocking.

In this manner, false positive connection blocking is prevented or reduced, to allow establishment of connections by the allowed code. Errors in identification of suspicious connection establishment trials associated with malicious communication are prevented or reduced, by detecting when the suspected trial is actually not related to malicious code but is related to allowed and/or normal code (that displays malicious like behavior).

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As described herein, the term flow-data means data collected at the client terminal, which includes call stack data, and optionally one or more call stack related data items, such as process data, module analysis data, and thread data. The terms flow-data and call stack data may sometimes be interchanged.

As defined herein, the term connection establishment means the computerized processes that occur before the allowed code is able to transmit and/or receive data over a network connection. The connection establishment process may be managed and/or executed by an application programming interface receiving initiation commands from the normal code to establish the connection, to receive data from the normal code to transmit over the established connection, and/or to transmit data received over the established connection to the normal code.

Reference is now made to FIG. 1A, which is a flowchart of a method for evaluation of flow-data optionally in view of context data, of a network connection, in accordance with some embodiments of the present invention. Reference is also made to FIG. 2, which is a system for authenticating a new network establishment process, in accordance with some embodiments of the present invention. The system described with reference to FIG. 2 may execute the method described with reference to FIG. 1B.

The systems and/or methods collect malicious looking behavior, which when observed at multiple clients, implies incorrect detection of malicious activity. The malicious behavior is re-designated as allowed behavior. The systems and/or methods identify new unknown code as being allowed, based on a flow-data template created based on common patterns seen as other clients. The common patterns are assumed to be generated by the same (or similar) allowed code. When the new data is compared and matched against flow-data template, the unknown code related to the new data is designated as allowed code, which is the same or similar allowed code used to train the template.

External designations of each installed code (e.g., as being allowed and/or malicious) is not required. The systems and/or methods automatically designated code as allowed when common patterns are seen, and new unknown code as allowed when the new data is correlated with the learned flow-data template. The installed code is automatically designated as being allowed by the systems and/or methods described herein, without necessarily requiring pre-designated of each code by an external entity, for example, the system administrator does not need to validate the code. Alternatively, manual intervention may be allowed, for example, to manually correct errors in identification and/or matching of events, and/or errors in designating code as allowed and/or designating code as malicious, or other corrections. The manual intervention is granted, for example, to the system, method, and/or a computer program product administrator.

The system for designation of allowed code and/or quality assurance of detection of a network connection for a malicious communication may be installed, for example, within a system 200.

System 200 includes at least one client 202, for example, a laptop, a desktop, a mobile device (e.g., Smartphone, tablet), and/or a server. Client 202 is an endpoint client capable of initiating a new network connection for data transmission from client 202 and/or to client 202. Endpoint client 202 may be a server.

Client 202 includes network connection capabilities, for example, a network interface, transmitter, and/or receiver. Client 202 may communicate with a legitimate remote server 204 through one or more network(s) 206, for example, a wireless network, a wired network, a cellular network, internet, a private network, and combinations of multiple networks thereof.

Optionally, an endpoint module 208A is installed on a memory of (or in communication with) one or more clients 202 (e.g., pre-installed, integrated with an operating system running on the client, and/or downloaded from a remote server or local memory and locally installed). Optionally, endpoint module 208A contains code including program instructions for implementation by a processor of client 202, and for monitoring connection establishment related activity on client 202, as described herein. Alternatively or additionally, module 208A performs functions as directed by a gateway 210 and/or event management server 216, for example, to block the attempted network establishment connection, to halt the connection establishment process, and/or to activate the connection.

Event management server 216 receives data related to applications during the connection establishment process from multiple clients 202, (e.g., network messages, encapsulated in packets and/or frames) analyzes the data for previously observed aggregated common patterns, evaluates the aggregated observations for a predefined requirement, and generates a set of rules based on the flow-data template defining data related to the allowed applications, optionally using an aggregation module 218. When a connection establishment process is related to unknown code, a gateway 210 applies set of rules 224, which includes the new rules, to designate the unknown code as the allowed code, and allow the establishment of the new network connection.

Figure 1B:
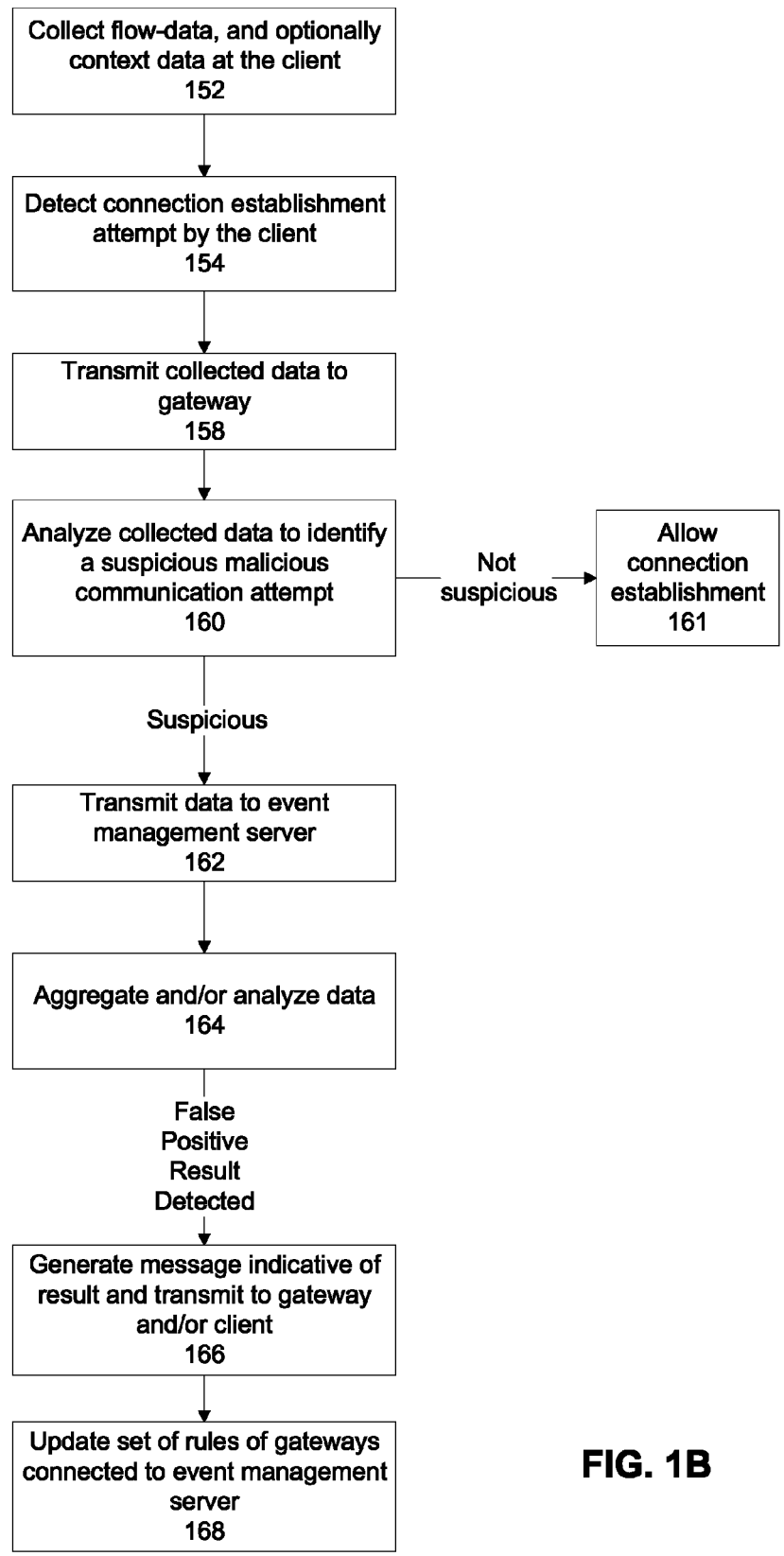
FIG. 1B is a flowchart of a method for quality assurance of detection of a network connection for malicious communication, in accordance with some embodiments of the present invention.
Figure 2:
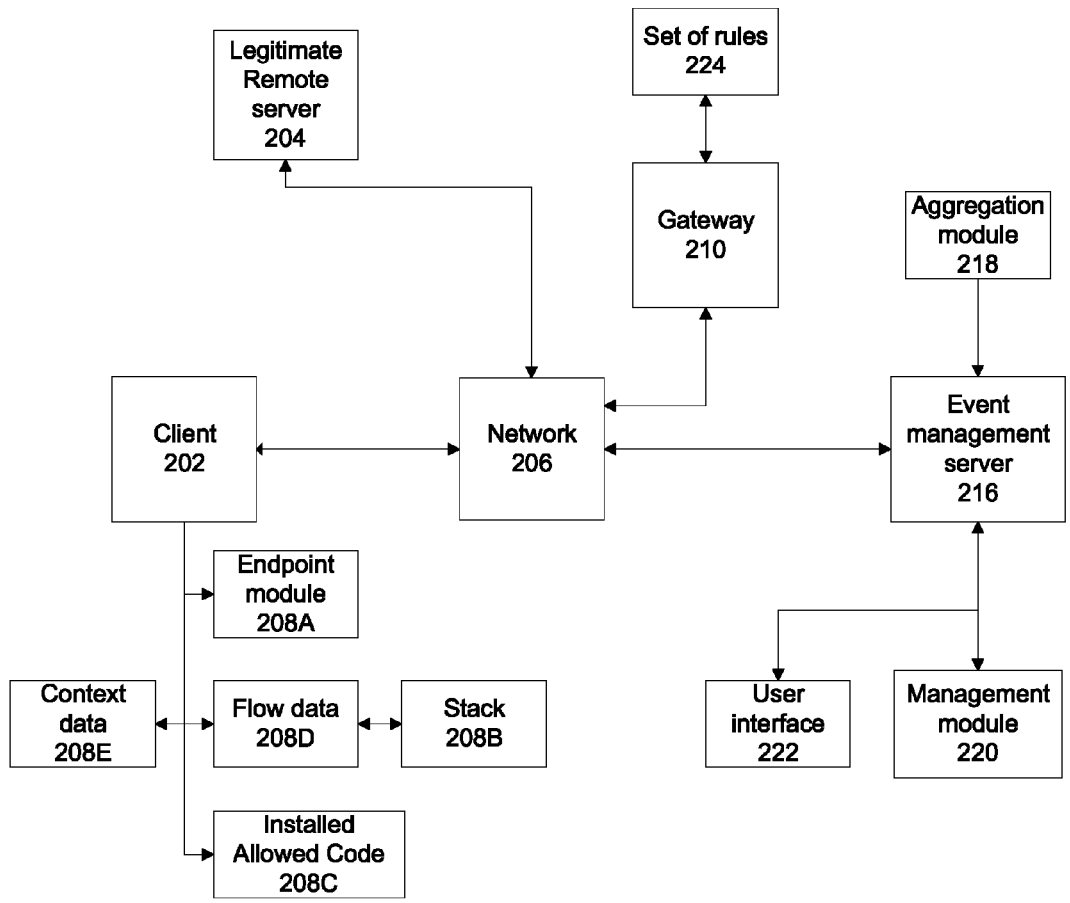
FIG. 2 is a block diagram of components of a system for evaluating data of a network connection, optionally based on quality assurance of detection of a network connection for malicious communication, in accordance with some embodiments of the present invention.

It is noted that the method of FIG. 1A describes the method focused on processes within the event management server 216, while FIG. 1B describes the overall method across the components of the system.

At 102, data related to flow-data (e.g., records in stack trace(s)) of a code during a connection establishment process for establishing a network connection is received at the management server. Data may be transmitted over a network connection as network messages, such as encapsulated in packets and/or frames. Optionally, the data is locally collated, optionally by endpoint module 208A at each respective client 202, which includes code implementable by the processor of the client. Optionally, the data is transmitted from each client to the management server via respective gateways (each gateway communicates with a set of clients and with the management server, as described herein).

Optionally, event identification (ID) and/or host data related to the connection establishment attempt is locally collected by endpoint module 208A. Examples of host data include one or more of: user name, company name, company department, company team, other organizational internal group name, virtual machine name, network addresses related to the connection establishment attempts, such as address of the client machine, and address of the allowed code. Examples of event ID may include: triggered malicious-rule identification, the operating system running at the respective client device, the allowed application, the installed allowed module, and the communication protocol used in the attempt to establish the network connection (e.g., transmission control protocol (TCP)).

Optionally, the collected data is transmitted to event management server 216. Alternatively or additionally, the collected data is first transmitted to gateway 210, as described with reference to FIG. 1B.

Each client 202 has installed thereon allowed code 208C associated with the connection establishment process.

Allowed code 208C, for example, an allowed application and/or an allowed module is installed within client 202, for example, manually by a network administrator and/or automatically based on permissions. Allowed code 208C initiates connection establishment trials to establish and activate a network connection.

Allowed code 208C may be programmed with bad practice connection establishment data that are similar to connection establishment data of malicious code infected applications.

Allowed code 208C may be an independent application, for example, a customized and/or in-house application. Custom-made and/or in-house applications may be designed to address organizational specific requirements and/or fix gaps in software deployment. At the enterprise segment, in-house applications may be created and/or customized to address a critical business function at a particular business. Software designed for specific internal requirements may use un-standard methods such as code injection to intervene in connection establishment in a manner similar to methods used by malicious code. In another example, code 208C may be an allowed custom security audit and/or enforcement applications, which enforces compliance with company policies across company clients (e.g., desktops, laptops and servers). The security application may be authorized to be invasive, authorized to involve connection hijacking, and/or authorized to perform other enforcement methods which are similarly performed by malicious code.

Code 208C may be a module that is installed in association with an existing application on client 202, for example, as a plug-in, a patch, and code injection. For example, module 208C may be a security tool designed for trusted browsing. Module 208C may be installed within an existing web browser by injecting code into the web browser to manipulate network connection communications. The code injection is performed similar to the way in which code injection based malicious code works. The injected code generates flow-data of the connection establishment initiating application that is similar to flow-data of an application with maliciously injected code.

Code 208C may be related to the application programming interface, for example, the socket managing the connection establishment according to a transmission control protocol (TCP) of the internet protocol suite.

Optionally, the flow-data is obtained from a call stack and/or other data sources related to the application attempting to establish the network connection, for example, copied from the relevant locations in memory associated with the processor executing the instructions in the stack. The stack trace includes data and/or snapshot(s) of sequences of processes in the call stack related to the connection establishment. For example, the stack trace includes the modules within the call stack at the time the trace is obtained. The modules may be derived based on representations within the call stack, for example, pointers within the call stack pointing to the modules.

One or multiple stack traces may be obtained at one or multiple points in time during the request, initiation of the connection establishment process, and/or during the connection establishment process. The multiple stack traces captured at multiple points during the connection establishment process are selected to capture changes in the stack occurring during the request and/or connection establishment process.

Optionally, at 104, the flow-data received from each client is classified according to context, optionally by aggregation module 218 of server 216, which includes code implementable by the processor of server 216. The context is based on the event ID, optionally including the host data. The context may help determine when the flow-data is malicious and when the flow-data is allowed. For example, flow-data appearing when a network browser is loaded may be malicious, while the same (or similar) flow-data appearing when a customized organization specific application is loaded may be safe. In another example, repeated flow-data observed at the same host may be malicious, while the same (or similar) flow-data observed at multiple different hosts may be safe.

Optionally, the context includes a predefined period of time, for example, an hour of the day, a day of the week, or a certain date. Optionally, classification is performed when the flow-data is received within the same predefined period of time. The period of time may be selected to represent roll-out and installation of the code on multiple clients. It is noted that flow-data associated with a period of time outside of the time context may represent patterns of infection, as opposed to allowed installation.

The context data may help differentiate when flow-data represents malicious communication from when flow-data represents allowed behavior. Context data may be collected in association with the identified connection establishment flow-data. Examples of context data include one or more of: operating system running at the respective client, known allowed applications running at the respective client, high correlation (e.g., above a threshold) of flow-data associated with different allowed applications, and communication protocol used in the attempt to establish the network connection. For example, different applications executed on different clients under the same (or similar) operating system, may generate similar flow-data under similar context data. The flow-data is designated as related to allowed behavior by the allowed applications.

At 106, new flow-data of new code associated with a new connection establishment attempt at a certain client 202 is transmitted to event management server 216. The new flow-data is optionally analyzed by aggregation module 218, which includes code implementable by the processor of server 216. A similarity (e.g., correlation) is measured between the new flow-data and multiple stored previously observed flow-data templates (which may be stored as a dataset on a memory in communication with server 216), to identify a match with a flow-data template. The new flow-data is matched, such as when the correlation of similarity is above a correlation threshold. It is noted that the flow-data and template do not necessarily need to match entirely, but be similar enough as defined by the correlation threshold.

Optionally, the similarity is measured according to a malicious-rule that triggered the identification of the possible malicious event and collected of flow-data, for example, a dataset of flow-data related to the application that has been identified as possibly being related to malicious activity.

Alternatively or additionally, the similarity is measured according to the context data. The new flow-data is compared to a sub-set of flow-data template having the same or similar context data, to identify a match within the sub-set. In this manner, other templates which may match, but are irrelevant, are excluded a priori. Matched templates occurring in other contexts may represent malicious behavior, and cannot be excluded when occurring in a different context.

Alternatively or additionally, the similarity is measured according to similarity in stack-trace specific details between the stack-trace collected from the client and the stack-trace of the previously observed event, for example, type of stack, and modules in the stack.

Optionally, matching is performed step-wise in a hierarchical manner, to improve processing performance, by first matching the triggered malicious rule, then matching the context, and then matching the stack-trace data. Alternatively, matching is performed simultaneously, such as by a classifier or a set of rules, that maps the triggered malicious rule, context, and stack-trace data to a certain event.

Optionally, at 107, when no match is found, the new flow-data is stored as a new flow-data template by code implementable by the processor of server 216. The new flow-data template is then matched to new received flow-data. Alternatively or additionally, the flow-data template is based on preset definitions. For example, an administrator may manually define certain flow-data template representing allowed behavior.

Alternatively 108, when a matched flow-data template is found, the matched flow-data template is evaluated for a predefined requirement, optionally by aggregation module 218. The evaluation may be set for matching one or more rule requirements. Optionally, each malicious-rule is associated with its own predefined requirement. The predefined requirement may be, for example, a threshold, a range, and/or a function.

Optionally, the predefined requirement represents a number of matches that are to be observed for validating the associated template. A counter indicative of the number of previously observed matches is optionally incremented during each match of different host data. Alternatively, other counting methods may be used, for example, a function may be calculated based on the number of previous matches. The value of the counter is compared to the predefined requirement, to determine when the value meets or exceeds the predefined requirement, for example, falls within the range, defined by the function and/or meets or exceeds the threshold.

Optionally, the new flow-data that has been matched may be stored in a dataset in association with the matched flow-template. Storing of the set of multiple flow-data may allow for periodic (or continuous) updates of the template, such as when different variations are observed. Alternatively or additionally, the set of multiple flow-data may be re-aggregated into the updated template. Alternatively or additionally, the members of the set of flow-data may represent allowed variations in the matched template, for example, to account for local client configurations, for example, different versions of the code, and/or the operating system. The counter value may be obtained by performing a count of the members of the dataset.

Optionally, the requirement is static, for example, an absolute number, such as the number of matches from different clients of the same group that are to be observed before validating the matched template. Alternatively or additionally, the requirement is dynamic, which may be changed according to underlying variables. For example, a percentage of clients in the group that are to be matched to the same template. The percentage may remain the same, while the number of matches is adapted to the total number of clients in the group, which may change over time as new clients are added. In another example, the requirement is a function of one or more security related metrics which may be calculated for the context, for example, related to the security protection provided by the communication protocol, security level of employees working for the department, and known security faults of the connecting application or operating system.

The requirement may be manually predefined (e.g., by a system manager), automatically defined (e.g., by an algorithm calculated from one or more variables), and/or obtained from an external source (e.g., downloaded from a central server).

It is noted that the counter value and/or requirement may be defined according to the context. Optionally, the different clients have the same context, such as the same designated group. In this manner, the same (or similar) flow-data observed within different clients of the same group (e.g., same company, same department, same team) represents allowed behavior, such as due to an installation of software on clients of the same group. The same flow-data observed within clients of the same group is more likely to be allowed behavior than the same flow-data observed within different clients of different organizations (which is less likely to be due to common software installed by the same entity).

Optionally, different requirements are selected for different contexts. Optionally, different requirements are selected for different contexts when the same template is matched. The different requirements may represent, for example, different levels of desired security for the different contexts, such as a low security level for general clerical staff of the company, and a high security level for the financial staff of the company.

Optionally, the requirement may be selected according to a probability value representing a confidence level of the requirement representing allowed behavior. The requirement may be selected (manually or automatically) to prevent or reduce false positive connection blocking of allowed network connections. A high requirement may flag previously malicious attempts as safe in cases where certainty is high. The high requirement may be selected, for example, where malicious activity cannot be tolerated, even at the cost of blocking certain safe programs (it is noted that the safe programs may be manually approved for future connection establishment), for example, in an organization having sensitive material, such as a military installation. A low requirement may flag previously malicious attempts as safe in cases where certainty is low. The low requirement may be selected, for example, in an organization where customized programs are crucial and represent significant activity on the computers of the organization.

Optionally when the requirement has not yet been met, at 109, the counter value is incremented by code implementable by the processor of server 216, when the match is observed for a new client (i.e., no previous matches). Repeated matches associated with the same client do not further increment the counter, such as to avoid counting repeated communication establishment attempts by the same application of the same client. In this manner, the number of different clients having the same (or similar) flow-data is counted. When enough clients having the same flow-data are observed (as defined by the requirement), the flow-data is authenticated, as at 110.

It is noted that the counter is incremented based on flow-data received from multiple clients, where each respective client executes similar installed code. The same, similar, or high correlation (e.g., above a threshold) of flow-data from the respective clients represent that the executed code is validated and/or allowed. The code (and/or related flow-data) is automatically designated as representing allowed behavior, even when the received flow-data from each client would otherwise be designated as representing malicious communication attempts. Such a scenario may occur, for example, when customized code written in an unconventional manner (e.g., does not follow good common practice) is installed on company computers in an allowed manner. The code appears malicious, but is in fact allowed code.

Alternatively when the requirement has been met, at 110, a rule-set database is updated with the matched flow-data template by code implementable by the processor of server 216. New network connection attempts associated with the matched flow-data template may be authenticated, and allowed to establish connections.

Optionally, the new rules generated by event management server 216 may be transmitted over the network connection to client 202, or to other network devices, for example gateway 210. The set of rules 224 associated with each gateway 210 may be updated. The connection establishment process by future flow-data from the same (or similar) allowed code is allowed to be established for data transmission over the network.

Alternatively, when the flow of the unknown code is not correlated to any flow-data templates, a message indicative of suspected malicious communication attempt may be generated and transmitted. Further action may be taken, for example, blocking of the connection establishment attempt, and/or designation of the unknown code as malicious.

Optionally, at 112, the method is iterated to analyze new connection establishment attempts.

Reference is now made to FIG. 1B, which is a flowchart of a computer implemented method for quality assurance of detection of a network connection for malicious communication and/or activity, in accordance with some embodiments of the present invention. Reference is also made to FIG. 2, which is a system for method for quality assurance of detection of a network connection for malicious communication and/or activity, in accordance with some embodiments of the present invention. The system described with reference to FIG. 2 may execute the method described with reference to FIG. 1B.

The systems and/or methods provide quality assurance for an identified suspicious attempt at establishing the network connection, to determine when the connection establishment initiated by the code on the client (e.g., application, update module, plug-in, and patch) is actually associated with malicious activity, from when the connection establishment initiated by the code is associated with allowed and/or normal activity. The code may be normal code that generates suspicious flow-data that is similar to flow-data generated by malicious code. In this manner, allowed network connections established based on normal code are activated, instead of erroneously being blocked due to the identified suspicious malicious-like flow-data.

The systems and/or methods generate new rules to allow flow-data of locally installed normal code operating in a manner similar to malicious code, but that are actually not malicious code. For example, code and/or applications programmed based on bad practice connection establishment, customized and/or in-house modules and/or applications programmed to address organizational specific requirements, software patches, and modules designed to have a high level of administration privileges. In such cases, the systems and/or methods described herein perform the differentiation between flow-data associated with malicious code and flow-data associated with allowed and/or normal code (that behaves like the malicious code) which would be otherwise difficult to differentiate.

The systems and/or methods described herein improve network performance, by adding an additional quality assurance measure that prevents and/or reduces improper blocking or shut-down of network connections.

The systems and/or methods described herein differentiate between actual malicious connection attempts and incorrectly labeled normal connection establishment, without necessarily requiring knowledge of the specific malicious code and/or specific normal code.

Gateway 210 receives connection establishment related data from client 202, analyzes the data, and identifies a suspicious attempt at establishment of the network connection for malicious communication and/or activity. Optionally, gateway 210 is a proxy server acting as an intermediary between a certain application on client 202 initiating the establishment of the network connection and an interface controlling the establishment of the network connection. Additional details of gateway 210 may be found, for example, with reference to Provisional Patent Application No. 62/083,985.

Event management server 216 is in communication with one or more gateways 210. Server 216 receives data related to the identified suspicious attempt from gateway(s) 210, and determines when the suspicious attempt is associated with normal code, and optionally when the suspicious attempts is actually associated with malicious code. Event management server 216 generates a signal to the respective gateway 210 and/or to module 208A, indicating that the suspicious attempt is a false positive. The signal may be a new or updated set of rules to be installed within set of rules 224 used by gateway 210 to validate and allow connection establishments.

Optionally, a management module 220 of event management server 216, associated with a user interface module 222 of event management server 216, allows a user to perform one or more administrative and/or monitoring functions, for example, configurations, updates, activity and/or event review. Users may access user interface 222, for example, through a web browser over a network connection. Data may be viewed and/or analyzed centrally for multiple clients and/or gateways and/or event management servers, or per client and/or gateway and/or event management server.

Figure 3A:
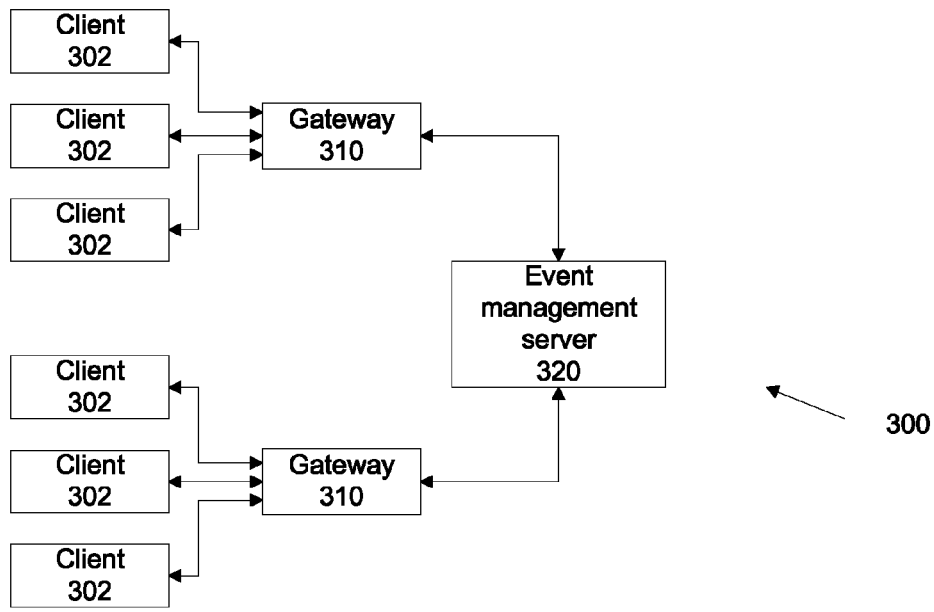
FIGS. 3A-B are block diagrams of system architectures based on the system of FIG. 2, in accordance with some embodiments of the present invention.
Figure 3B:
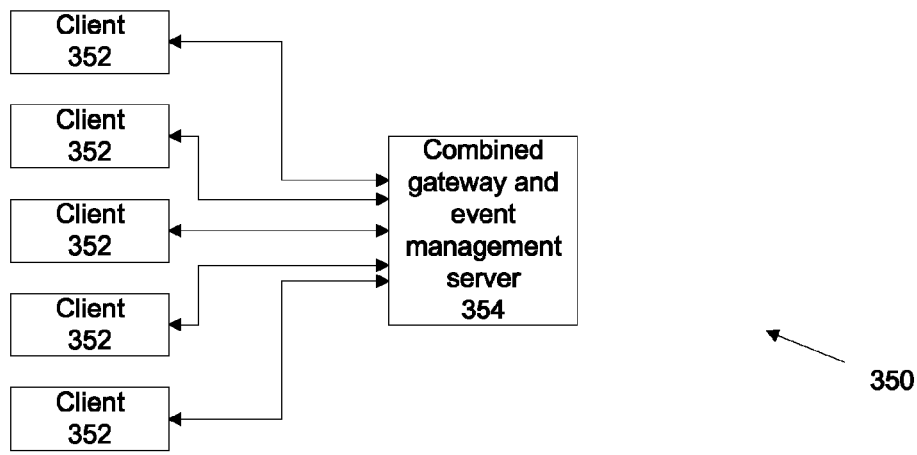

Reference is now made to FIGS. 3A and 3B, which are block diagrams of some examples of architectures based on system 200 of FIG. 2, in accordance with some embodiments of the present invention.

FIG. 3A depicts an architecture of a system 300 in which an event management server 320 is in communication with multiple gateway servers 310. Each gateway server 310 is in communication with multiple clients 302. System 300 may be designed, for example, for a large organization, in which each gateway 310 serves a designated group of clients 302 (e.g., by department, by client type, and/or by geographical location), with event management server 320 connected to the gateways 310 of the organization. It is noted that there may be multiple event management servers 320 connected to one another to exchange learned information.

System 300 may be designed for hierarchical malicious code monitoring, which may improve efficiency of monitoring connection establishments, which may occur frequently. Each client 302 is monitored for connection establishment. The connection establishments are analyzed by gateway 310 to identify the sub-set of connection establishments that appear as a suspicious connection establishment attempts. The suspicious attempts undergo quality assurance by event management server 320, to detect a false positive identification.

FIG. 3B depicts an architecture of a system 350 in which the gateway and event management server are integrated into a single component, a combined server 354. Clients 352 communicate with combined server 354. System 350 may be designed, for example, for a small organization, or an isolated department, in which each server 354 serves a group of clients 352, providing both the function of identification of the suspicious attempt and quality assurance of the suspicious attempt. It is noted that there may be multiple combined servers 354 (e.g., across the organization), which may or may not be connected to one another.

System 350 may be designed for localized malicious code monitoring, which may provide fast monitoring of connection establishment, for example, to an organization which is geographically isolated, an organization with limited bandwidth availability, and an organization in which monitoring of connection establishment needs to be performed quickly (e.g., to reduce time of approval of the connection establishment, and/or to serve a high frequency of connection establishments).

Referring now back to FIG. 1B and FIG. 2, gateway 210 and/or server 216 may be a software module for installation on a computer, and/or hardware equipment for communication with other computers. Gateway 210 and/or server 216 may be installed, for example, as connected to network 206, at the interface between client(s) 202 and network 206 (e.g., network interface device), and/or installed within network 206 itself, for example, within an internal and/or boundary network device (e.g., layer 2 device, layer 3 device, router, gateway, and bridge).

Allowed code 208C has been authorized for installation, may still trigger an identification of a suspicious attempt at connection establishment for a malicious communication, as described herein. Allowed code 208C is associated with flow-data that is similar and/or has high correlation to flow-data of infected applications.

At 152, flow-data, including call stack data, related to the connection establishment process is collected at the client, for example, by code of endpoint module 208A implementable by the processor of the client. The flow-data are captured prior to and/or during the connection establishment process.

The data may include records in the flow-data representing process, threads, modules and dynamic code being executed at the client terminal. Flow-data is obtained during the command to initiate establishment of the network connection, such as flow-data related to threads, processes, and/or modules.

Optionally context data is collected. The context data may be saved for later transmission to the quality server.

Optionally, at 154, connection establishments are monitored to identify attempts at establishing network connections. The monitoring and/or analysis may be performed at each client 202 by respective module 208A, and/or by gateway 210 for respectively connected clients 202.

Alternatively or additionally, installation of new code (e.g., an application, a plug-in, a patch, and an add-on) is identified, for example, by end-point module 208A. The new code may be purposely installed by the user, and may even act safely, but may perform actions against company policy. For example, installation policy may prohibit software such as piggyback applications, browser add-ons, and live messenger applications. Such code may be identified as being against company policy, for example, representing a security threat (e.g., used in hijacking), overuse of limited resources (e.g., excessive use of company bandwidth), and/or determined by company management to be a waste of time distraction from work. As used herein, the term malicious communication also means activity of code installed against policy, regardless of whether the code itself is malicious or safe. Flow-data related to the newly installed application may be analyzed (as described herein) to identify the trial to establish the connection as being associated with malicious communication that may represent allowed behavior but a breach of policy.

Additional details of systems and/or methods for detection connection establishment are described, for example, with reference to U.S. Provisional Patent Application No. 62/083,985, by the same applicant and same inventors of the present application.

At 158, the flow-data and optionally the context data is transmitted to gateway 210 from client 202, for example, by endpoint module 208A which may access the stack data and/or other flow-data within client 202.

At 160, the data is analyzed to detect a suspicious attempt at establishing a connection for a malicious activity and/or communication by code installed on client 202. The stack trace and/or other flow-data may be analyzed to determine a presence or absence of a suspected trial to establish a malicious communication using the network connection for malicious activity. Optionally, the analysis is performed by gateway 210, optionally using set of rules 224, and/or another policy enforcer module.

Optionally, a signal representing the presence or absence of the malicious communication is generated.

The analysis may be performed prior to data communication between the application and the remote server or malicious server, such as forwarding of data over the network by the initiating application. Optionally, the analysis is performed prior to establishment of the network connection. Alternatively or additionally, the analysis is performed prior to activation of the network session. In this manner, the validity of the connection establishment process may be determined before the malicious agent is able to act through the network connection, for example, prior to transmission of unauthorized data (i.e., stealing of data).

The analysis may be performed based on one or more methods, for example, the correlation may be performed to identify a statistically significant correlation (e.g., of stack traces, modules in the stack, and unique events) association with malicious activity, and/or a statistically significant association with validated safe activity. The analysis may be performed based on verification of safety of modules in the stack, threads, and/or process executable file format, for example, identifying when the records represent illegal flow-data.

Additional details of analysis methods may be found, for example, with reference to U.S. Provisional Patent Application No. 62/083,985.

Alternatively, the gateway analysis does not decisively determine whether the attempt at connection establishment is related to malicious code or allowed code. For example, the probability of being related to malicious code is about 50% and/or the probability of being related to allowed code is about 50%. Other decisive requirements may be used, for example, other probability thresholds, other ranges, and/or functions. Such a case may arise, for example, when the gateway identified a suspicious application installer on the client terminal attempting to initiate a communication session. Optionally, a message is transmitted by the gateway to the respective client terminal with a request for manual intervention by a user (e.g., operator, system administrator), for example, a pop-up window may appear on the display of the client terminal. The user may be presented with the ability to manually define the code as allowed code and/or as malicious code, for example, by clicking a button within the pop-up window. The manual designation may be added to the set of rules associated with the gateway, to apply to the same client in future communication establishment attempts. Propagation to other gateways and/or application to other clients may be defined by an administrator and/or predefined system preferences. For example, application to other clients may be enabled in a private organization network (in which only registered employees are allowed), but disabled in an open public network to prevent malicious users from deceiving the system and marking malicious code as allowed.

As used herein, the phrase previously observed includes the case of manual designation. The manual designation is treated and/or processed (i.e., by the systems and methods described herein) as described with reference to the phrase previously observed. It is noted that the manual designation is treated as previously observed in cases when the system and/or methods have not performed the previous observation, when instead the manual intervention is defined as the previous observation.

Optionally, at 161, when the analysis by gateway 210 (block 160) is determined to represent allowed behavior, the connection establishment is allowed. When no suspicious attempt is detected, the connection establishment may resume (and/or the network connection may be activated), for example, by a message transmitted from gateway 210 to client 202. Additional analysis of the stack trace(s) by quality server 216 may not be necessary.

Alternatively, at 162, when the analysis by gateway 210 (block 160) is determined to represent an attempt at a malicious connection, the flow-data including call stack data is transmitted to event management server 216 for additional analysis, for example, by gateway 210.

Gateway 210 (and/or client 202) may send additional context data retrieved from client 202 to server 216 in association with the call stack data, for assisting in analysis of the call stack data, as described herein. The context data may be collected after the analysis of block 160 indicates the malicious communication attempt, or may have been collected together with the flow-data.

Optionally, gateway 210 generates and transmits a message to server 216 requesting quality assurance for the suspicious result.

At 164, the flow-data and optional context data are aggregated and/or analyzed to correct the analysis of the gateway and identify the malicious activity as normal (i.e., correct a false positive result). The analysis may be performed at event management server 216 based on aggregation module 218, as described herein, for example, with reference to FIG. 1A. The analysis may prevent or reduce a false positive identification. The malicious result may be re-classified as normal allowed activity.

Figure 4A:
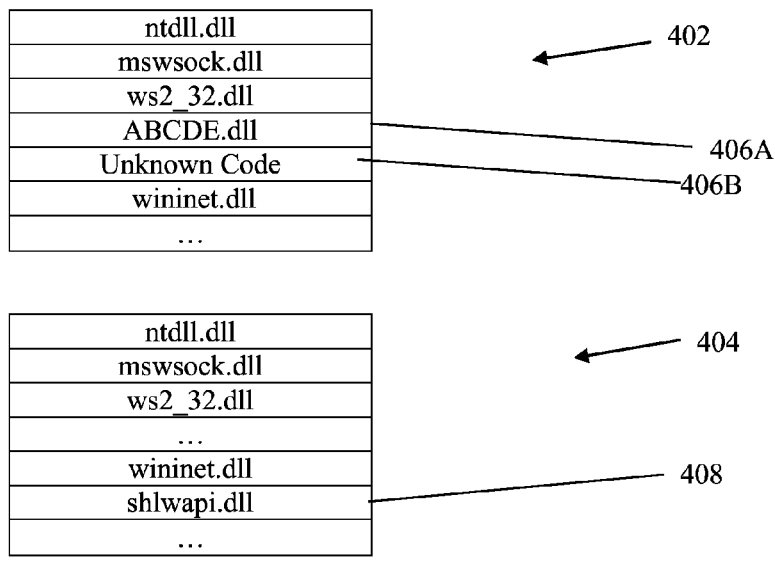
FIGS. 4A-4B are examples of call stacks, in accordance with some embodiments of the present invention.
Figure 4B:
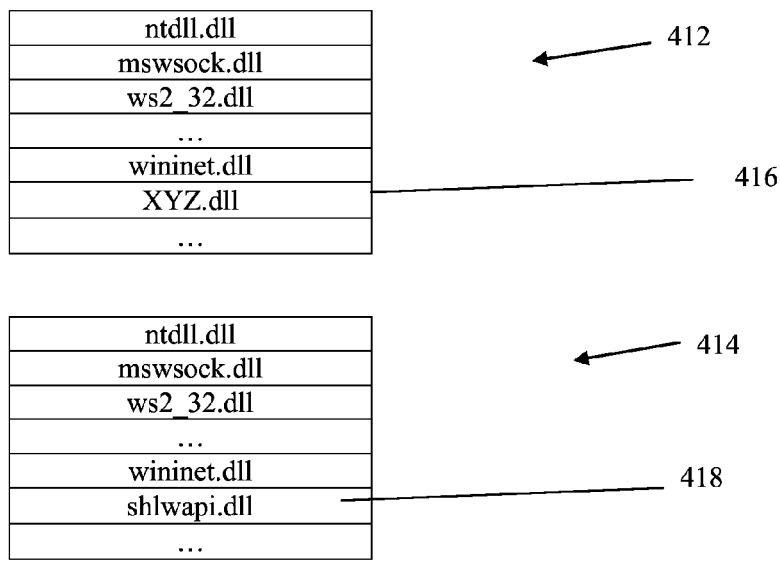

Reference is now made to FIGS. 4A-4B, which are examples of call stacks related to the connection establishment process in accordance with some embodiments of the present invention. For clarity, the figures depict a partial trace.

FIG. 4A depicts a call stack 402 of a web browser having a security tool installed within the browser, to provide trusted browsing. The security tool was implemented by injection of code designed to manipulate HTTP sessions. The security tool (which is allowed code) operates similarly to malicious code, and would otherwise generate a false positive, for example, when analyzed by the gateway.

Call stack 402 represents an attempt to establish a connection, for example, to connect to safe website. Call stack 402 is analyzed, by comparison against call stack 404 which represents a validated connection establishment related stack expected for the web browser without the installed security tool. The analysis detects that a certain file 408 (i.e., shlwapi.dll) is missing, and a code pointer to a known module 406A and another code pointer to an unknown module 406B is present. Based on an initial analysis of the flow-data (e.g., by gateway 210), malicious code is suspected. Further analysis (e.g., by quality server 216) based on call stacks seen from most or all other clients designated to the same organization, determines that call stack 402 represents allowed behavior of normal code.

FIG. 4B depicts a call stack 412 of a browser program in which a user installed a browser toolbar that redirects and manipulates connections mainly to effect search engine results. The toolbar does not necessarily represent outright malicious code, being offered as a safe application by a respected vendor. The toolbar is designated as prohibited for installation by the organization.

The browser with the toolbar is attempting to establish a network connection to a known safe website. Stack 412 contains known code 416 associated with the prohibited program. In comparison, call stack 414 is the call stack of the web browser without the installed toolbar. Call stack 414 contains a pointer to a module 418 (i.e., shlwapi.dll) not present in call stack 416. The known call stack may be programmed into the learning module, to identify web browsers with the installed toolbar that is against company installation policy.

Referring now back to FIG. 1B, at 166, a message indicative of the result of the analysis is generated by event management server 216. The message is transmitted to gateway 210 and/or client 202. The message may include an update to the set of rules, indicating that the matched flow-data event represents allowed connection establishment attempts.

When the message is indicative that the malicious communication has been incorrectly detected, the gateway 210 and/or client 202 may continue in the connection establishment process, and/or activate the connection. When the message is indicative that the malicious communication has been correctly detected, the gateway 210 and/or client 202 may block (or continue maintain the blockage of) the connection establishment and/or prevent data transmission over the connection.

Optionally, at 168, each set of rules 224 of each gateway 210 connected to event management server 216 is updated with the received set of rules. Updating the set of rules 224 of each gateway 210 dynamically adapts the gateways 210 connected with event management server 216 with the new identified flow-data associated with new code installed within clients 202.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems and methods will be developed and the scope of the terms client, server, and code is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for authenticating an attempt at establishment of a network connection by allowed code, comprising:
    providing a dataset having a plurality of previously observed stack trace templates each representing a stack trace pattern prevailing in stack traces recorded by monitoring a plurality of stacks of a plurality of clients executing the allowed code during a connection establishment process for establishing network connections related to the allowed code;
    receiving a new stack trace recorded during a new connection establishment process for a new network connection by a new client;
    measuring a similarity between the new stack trace and the plurality of stack trace templates to identify a match to a stack trace template;
    evaluating the matched stack trace template for a predefined rule requirement; and
    updating a rule-set database with the matched stack trace template to authenticate new network connection establishments associated with stack templates matching the matched stack trace template;
    wherein the plurality of stack trace templates and the new stack trace include context data collected in association with the stack trace of the allowed code, and the similarity is measured according to the context data;
    wherein the context data includes an event ID and/or host name.

2. A method for authenticating an attempt at establishment of a network connection by allowed code, comprising:
    providing a dataset having a plurality of previously observed stack trace templates each representing a stack trace pattern prevailing in stack traces recorded by monitoring a plurality of stacks of a plurality of clients executing the allowed code during a connection establishment process for establishing network connections related to the allowed code;
    receiving a new stack trace recorded during a new connection establishment process for a new network connection by a new client;
    measuring a similarity between the new stack trace and the plurality of stack trace templates to identify a match to a stack trace template;

evaluating the matched stack trace template for a predefined rule requirement; and
    updating a rule-set database with the matched stack trace template to authenticate new network connection establishments associated with stack templates matching the matched stack trace template;
wherein the plurality of stack trace templates and the new stack trace include context data collected in association with the stack trace of the allowed code, and the similarity is measured according to the context data;
wherein the context data includes at least one member selected from the group consisting of: similar operating system running at the respective client, similar allowed application, similar stack trace data by different allowed applications, and similar protocols to establish the network connection.

3. A method for authenticating an attempt at establishment of a network connection by allowed code, comprising:
    providing a dataset having a plurality of previously observed stack trace templates each representing a stack trace pattern prevailing in stack traces recorded by monitoring a plurality of stacks of a plurality of clients executing the allowed code during a connection establishment process for establishing network connections related to the allowed code;
    receiving a new stack trace recorded during a new connection establishment process for a new network connection by a new client;
    measuring a similarity between the new stack trace and the plurality of stack trace templates to identify a match to a stack trace template;
    evaluating the matched stack trace template for a predefined rule requirement; and
    updating a rule-set database with the matched stack trace template to authenticate new network connection establishments associated with stack templates matching the matched stack trace template;
    wherein evaluating the matched stack trace template comprises: incrementing a value of a counter indicative of a number of previous stack trace template matches from different clients, and evaluating the value against the predefined rule requirement of a number of matches.

4. The method of claim 3, wherein the different clients are part of a same designated group.

5. A method for authenticating an attempt at establishment of a network connection by allowed code, comprising:
    providing a dataset having a plurality of previously observed stack trace templates each representing a stack trace pattern prevailing in stack traces recorded by monitoring a plurality of stacks of a plurality of clients executing the allowed code during a connection establishment process for establishing network connections related to the allowed code;
    receiving a new stack trace recorded during a new connection establishment process for a new network connection by a new client;
    measuring a similarity between the new stack trace and the plurality of stack trace templates to identify a match to a stack trace template;
    evaluating the matched stack trace template for a predefined rule requirement; and
    updating a rule-set database with the matched stack trace template to authenticate new network connection establishments associated with stack templates matching the matched stack trace template;
    wherein evaluating the matched stack trace template for the predefined rule requirement is performed when the matched stack trace template and the new stack trace are associated with different clients.

6. The method of claim 5, wherein the plurality of stack trace templates are designated as representing suspicious malicious behavior of the allowed code.

7. The method of claim 5, wherein the plurality of stack trace templates and the new stack trace include context data collected in association with the stack trace of the allowed code, and the similarity is measured according to the context data.

8. The method of claim 5, further comprising adding the new stack trace to the dataset as a new stack trace template based on an absence of the match.

9. The method of claim 5, wherein the new stack trace and the plurality of stack trace templates further comprise flow-data including at least one member selected from the group consisting of: processes, modules, and threads.

10. The method of claim 5, wherein the new stack trace displays malicious-like behavior that has a similarity to stack traces related to malicious code.

11. The method of claim 5, wherein the plurality of stack trace templates are based on authorized installation of similar allowed code on a plurality of the clients within a predefined period of time.

12. The method of claim 5, wherein the predefined requirement is selected to prevent or reduce false positive connection blocking of allowed network connections by the allowed code.

13. The method of claim 5, wherein the predefined requirement represents a tolerance level for false positive connection blocking of allowed network connections.

14. A method for authenticating an attempt at establishment of a network connection by allowed code, comprising:
    providing a dataset having a plurality of previously observed stack trace templates each representing a stack trace pattern prevailing in stack traces recorded by monitoring a plurality of stacks of a plurality of clients executing the allowed code during a connection establishment process for establishing network connections related to the allowed code;
    receiving a new stack trace recorded during a new connection establishment process for a new network connection by a new client;
    measuring a similarity between the new stack trace and the plurality of stack trace templates to identify a match to a stack trace template;
    evaluating the matched stack trace template for a predefined rule requirement;
    updating a rule-set database with the matched stack trace template to authenticate new network connection establishments associated with stack templates matching the matched stack trace template;
    analyzing the new stack trace, to designate the network connection as being suspicious of being related to malicious code; and
    re-designating the suspicion of being related to malicious code as being related to the allowed code.

15. The method of claim 14, wherein the suspicion of being related to malicious code is triggered by a new allowed code installed on the new client displaying malicious-like behavior.

16. The method of claim 14, wherein the allowed code represents a false positive identification by incorrectly triggering the identification of suspicious of being related to malicious code.

17. The method of claim 14, wherein the stack trace associated with the authenticated new network connection is matched to at least one stack trace template associated with an attempt at establishing the network connection for malicious communication.

18. A system for authenticating an attempt at establishment of a network connection by allowed code, comprising:
a dataset having a plurality of previously observed stack trace templates each representing a stack trace pattern prevailing in stack traces recorded by monitoring a plurality of stacks of a plurality of clients executing the allowed code during a connection establishment process for establishing network connections related to the allowed code; and
a non-transitory computer readable storage medium storing a codes;
at least one processor adapted to execute the code to:
receive a new stack trace recorded at a certain new client of a plurality of clients during a new connection establishment process for a new network connection by the certain new client;
measure a similarity between the new stack trace and the plurality of stack trace templates to identify a match to a stack template:
evaluate the matched stack trace template for a predefined requirement; and
update a rule-set database with the matched stack trace template to authenticate new network connection establishments associated with stack templates matching the matched stack trace template:
at least one gateway server in communication with the event management server and with at least one of the plurality of client terminals, the at least one gateway server including a code implementable by a processor of the at least one gateways server to:
analyze the new stack trace to designate the new network connection as being suspicious of being related to malicious code;
transmit the new stack trace to the event management server for analysis;
receive the updated rule-set database; and
allow connection establishment of the new network connection.

19. The system of claim 18, wherein the allowed code is installed as injected code within an application, the injected code being associated with stack data similar to stack data associated with malicious injected code.

20. The system of claim 18, wherein the allowed code is configured with high level permission to establish a network connection in a manner similar to high level permission obtained by malicious code.

21. A system for authenticating an attempt at establishment of a network connection by allowed code, comprising:
a dataset having a plurality of previously observed stack trace templates each representing a stack trace pattern prevailing in stack traces recorded by monitoring a plurality of stacks of a plurality of clients executing the allowed code during a connection establishment process for establishing network connections related to the allowed code; and
a non-transitory computer readable storage medium storing a code;
at least one processor adapted to execute the code to:
receive a new stack trace recorded at a certain new client of a plurality of clients during a new connection establishment process for a new network connection by the certain new client;
measure a similarity between the new stack trace and the plurality of stack trace templates to identify a match to a stack template;
evaluate the matched stack trace template for a predefined requirement; and
update a rule-set database with the matched stack trace template to authenticate new network connection establishments associated with stack templates matching the matched stack trace template:
wherein the at least one processor is of at least one event management server which is in communication with a plurality of gateway servers, wherein each respective gateway server is in communication with at least one client of the plurality of clients, each respective gateway is includes a code implementable by a processor of each respective gateway to:
receive, from the new client, the new stack trace;
analyze the new stack trace to determine a presence or absence of a suspected trial to establish a malicious communication wherein the network connection is used for malicious activity;
detect an attempt at establishing the network connection for the malicious communication when the new stack trace is correlated with malicious data; and
generate a message representing the suspected trial to establish the malicious communication using the network connection; and
wherein the code of the event management server is implementable to receive the message from each respective gateway server, and perform the measuring, evaluating and updating to re-designate the new network connection as representing an allowed network connection, to prevent or reduce blocking of false positive network connections by allowed code that appear malicious to the respective gateway.

22. The system of claim 21, wherein the certain new client further comprises an allowed application associated with the allowed code that including a code implementable by a processor of the new client to trigger the suspicious of being related to malicious code identification.

23. The system of claim 21, wherein the at least one event management server and the plurality of gateway servers are combined into the at least one event management server.

24. A system for authenticating an attempt, at establishment, of a network connection by allowed code, comprising:
a dataset having a plurality of previously observed stack trace templates each representing a stack trace pattern prevailing in stack traces recorded by monitoring a plurality of stacks of a plurality of clients executing the allowed code during connection establishment process for establishing network connections related to the allowed code; and
a non-transitory computer readable storage medium storing a code;
at least one processor adapted to execute the code to:
receive a new stack trace recorded at a certain new client of a plurality of clients during a new connection establishment process for a new network connection by the certain new client:
measure a similarity between the new stack trace and the plurality of stack trace templates to identify a match to a stack template;
evaluate the matched stack trace template for a predefined requirement; and
update a rule-set database with the matched stack trace template to authenticate new network connection establishments associated with stack templates matching the matched stack trace template;
a client module for installation at each respective client, the client module including a code implementable by a processor of the respective client to:
identify a newly installed application at the respective client; and
analyze the newly installed application to identify a trial to establish a connection for malicious communication by the newly installed application
wherein the newly installed application is installed as an allowed application by a user that breaches an installation policy.

* * * * *